United States Patent Office 2,948,683
Patented Aug. 9, 1960

---

2,948,683

CORROSION INHIBITION OF DIMETHYL SULFOXIDE

Vincent A. Sullivan, Jr., and Tor Halfdan Smedslund, Chicago, Ill., assignors to The Stephan Chemical Company, Chicago, Ill., a corporation of Illinois No Drawing. Original application Jan. 4, 1954, Ser. No. 402,154. Divided and this application Dec. 6, 1957, Ser. No. 707,073

7 Claims. (Cl. 252—75)

The invention relates to corrosion inhibition, and more particularly, to corrosion inhibition with respect to certain aqueous and anhydrous dimethyl sulfoxide compositions which normally corrode metals.

Dimethyl sulfoxide, which has the following formula:

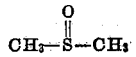

had, heretofore, been considered little more than a laboratory curiosity; but recently a number of particularly valuable uses have been discovered for dimethyl sulfoxide in its anhydrous form as well as in the form of aqueous solutions thereof. Such uses include uses in brake fluids as well as in anti-freeze (aqueous) compositions. It has also been found that dimethyl sulfoxide has a noticeable tendency to corrode metals (only in the presence of air), particularly iron and steel, and this tendency toward corrosion would ordinarily greatly limit the uses for dimethyl sulfoxide.

The instant invention is based upon certain discoveries which have been made relating to corrosion inhibition of dimethyl sulfoxide compositons. Primarily these discoveries relate to the finding of certain ingredients which may act as corrosion inhibitors in a dimethyl sulfoxide composition; but also these discoveries relate to certain conditions to which dimethyl sulfoxide compositions may be subjected so as to reduce their tendency toward corrosion of metals.

It is, therefore, an important object of the instant invention to provide improved corrosion inhibition for dimethyl sulfoxide compositions.

It is another object of the instant invention to provide aqueous and anhydrous dimethyl sulfoxide compositions which have improved corrosion inhibitors therein.

A further object of the instant invention is to provide a process of decreasing the corrosion of iron by dimethyl sulfoxide by maintaining an oxygen free atmosphere over the dimethyl sulfoxide and by dissolving a compatible inert base therein.

Yet another object is to provide dimethyl sulfoxide having dissolved therein in a concentration of 0.01–0.05 mol per liter a compatible non-corrosive base.

Other objects, features and advantages of the invention will become apparent to those skilled in the art from the following detailed disclosure of specific examples of preferred embodiments of the invention.

The invention consists in a composition consisting essentially of aqueous or anhydrous dimethyl sulfoxide and, as a corrosion inhibitor, a compatible inert base dissolved therein in a concentration of about 0.005–0.1 mol per liter. In the aqeous dimethyl sulfoxide composition the base imparts a pH of about 8–12, and preferably about 9–11, to the composition. The base used in the anhydrous dimethyl sulfoxide also has this property (with respect to aqueous dimethyl sulfoxide) but the pH determination in anhydrous dimethyl sulfoxide is not as clear cut a determination.

Dimethyl sulfoxide is somewhat hygroscopic and, therefore, anhydrous dimethyl sulfoxide or C.P. dimethyl sulfoxide usually has small amounts of water up to 0.1% which may be picked up by the dimethyl sulfoxide whenever it is exposed to moist air. As used herein, "anhydrous" dimethyl sulfoxide is C.P. dimethyl sulfoxide which contains not more than 0.1 weight percent moisture and has a melting point of at least 18.4° C. Aqueous dimethyl sulfoxide thus is a dimethyl sulfoxide composition containing at least more than the maximum moisture content for C.P. dimethyl sulfoxide and, for practical purposes at least about 10 weight percent of water. For practical purposes also the minimum amount of dimethyl sulfoxide in water is about 10 weight percent (or a 10% aqueous dimethyl sulfoxide solution). Preferably, a 30–60% aqueous dimethyl sulfoxide solution is used, since such a solution has a sufficiently depressed freezing point to make it particularly valuable for a number of uses including that of an anti-freeze composition. A 45% aqueous dimethyl sulfoxide solution is particularly useful, having a freezing point of minus 25° F.

The bases which may be used in the practice of the instant invention are preferably soluble in dimethyl sulfoxide and/or water and most preferably both. At least, such bases are soluble in the medium used which is either anhydrous or aqueous dimethyl sulfoxide; and the base is capable of imparting a pH of at least about 8–12, and preferably about 9–11, to the aqueous dimethyl sulfoxide using the proportions of base hereinbefore set forth.

The inorganic bases which may be used are preferably salts of a strong base (i.e. NaOH, KOH and NH$_4$OH) with a weak acid such as nitrous, phosphoric, chromic, boric, carbonic, etc. Typical examples of preferred inorganic bases are sodium nitrite, potassium nitrite, potassium chromate, trisodium phosphate, sodium borate, sodium carbonate, and ammonium hydroxide. Also, alkaline earth metal salts such as calcium and barium nitrites are sufficiently basic to be useful in the instant invention. The nitrite in particular may be a salt of an alkaline earth metal or an alkali metal.

Typical demonstrations of the corrosion inhibiting effect obtained in the instant invention are shown in the following examples.

*Example I*

A steel strip is immersed in C.P. dimethyl sulfoxide (as a control) maintained at 80° C. for six days and the strip is found to have a brass-like covering indicating a noticeable amount of corrosive action. If the process is repeated using a 45% aqueous dimethyl sulfoxide solution (as a control) a black coating indicating more extensive corrosive action is found on the strip.

A steel strip is immersed in a 45% aqueous dimethyl sulfoxide bath which has dissolved therein trisodium phosphate in a concentration of 0.005 mol per liter so as to impart a pH of 12.3 thereto; and it is noted that the strip is substantially unchanged after being immersed in the bath at 80° C. for 13 days.

*Example II*

Using a bath of 45% aqueous dimethyl sulfoxide solution having ammonium hydroxide dissolved therein in a concentration of 0.05 imparting a pH of 11.8 thereto and maintained at 80° C., it is found that the steel strip retained therein for a period of 11 days is substantially unchanged.

*Example III*

A steel strip is immersed in 45% aqueous dimethyl sulfoxide solution which has dissolved therein potassium nitrite in a concentration of 0.01 mol per liter so as to impart a pH of 9.4 thereto; and the strip is maintained in a bath maintained at 80° C. for 11 days at which time it is found that the strip is substantially unchanged.

*Example IV*

A procedure is carried out that is the same as that described in the foregoing example except that potassium chromate is substituted for potassium nitrite and the pH obtained is 10.6, and it is found that the results obtained are substantially the same.

Other formulations which have been found to be particularly effective include the following:

Formulations (45% aqueous dimethyl sulfoxide):
(A) Potassium nitrite _____ 0.1 mg./25 ml.
    Kerosene _____ 0.5 mg./25 ml.
(B) Guanidine carbonate _____ 0.1 mg./25 ml.
    Na lauryl sulfate _____ 0.1 mg./25 ml.
    Kerosene _____ 0.5 mg./25 ml.
    $NH_4OH$ _____ 0.5 mg./25 ml.

In addition, a particularly improved corrosion inhibiting effect is obtained, if the bath is maintained in an oxygen free atmosphere (such as acetylene). Acetylene is preferred for this purpose because it is soluble in dimethyl sulfoxide; but any oxygen free (i.e. gas free from molecular oxygen) gas may be used, such as nitrogen, ammonia, etc. The effectiveness of the step of excluding oxygen from the "zone" in which the strip is immersed in the dimethyl sulfoxide bath is particularly noticeable if a portion of the strip is positioned at the bath liquid level.

It will be noted that an improvement in the corrosion inhibiting effect is obtained if small amounts (i.e., 1.5 weight percent) of kerosene are included in the corrosion inhibiting formulation. Also, an improvement is obtained if small amounts (i.e., 0.1–2 weight percent) of wetting agents such as sodium lauryl sulfate are included.

Potassium nitrite appears to be the most effective inorganic base. This is a division of our application Serial No. 402,154, filed January 4, 1954.

Said application Serial No. 402,154 has now issued as U.S. Patent No. 2,818,388.

It will be understood that modifications and variations may be effected without departing from the scope of the novel concepts of the present invention.

We claim as our invention:
1. A composition consisting essentially of aqueous dimethyl sulfoxide and, as a corrosion inhibitor, a soluble inert inorganic salt of a strong base and a weak acid dissolved therein in a concentration of 0.005–0.1 mol per liter and imparting a pH of 8–12 to the composition.
2. A composition consisting essentially of aqueous dimethyl sulfoxide and, as a corrosion inhibitor, a soluble inert inorganic salt of an alkali metal base and a weak acid dissolved therein in a concentration of 0.005–0.1 mol per liter and imparting a pH of 8–12 to the composition.
3. A composition consisting essentially of aqueous dimethyl sulfoxide and, as a corrosion inhibitor, a soluble inert base dissolved therein selected from the class consisting of alkali metal salts of nitrous, phosphoric, chromic, boric and carbonic acids dissolved therein in a concentration of 0.005–0.1 mol per liter and imparting a pH of 8–12 to the composition.
4. A composition consisting essentially of aqueous dimethyl sulfoxide and, as a corrosion inhibitor, an alkali metal nitrite dissolved therein in a concentration of 0.005–0.1 mol per liter and imparting a pH of 8–12 to the composition.
5. Dimethyl sulfoxide having dissolved therein in a concentration of 0.01–0.05 mol per liter a compatible non-corrosive inorganic salt of a strong base and a weak acid.
6. Dimethyl sulfoxide having dissolved therein in a concentration of 0.01–0.05 mol per liter a compatible non-corrosive alkali metal nitrite.
7. A process of decreasing the corrosion of iron by dimethyl sulfoxide which comprises contacting iron with dimethyl sulfoxide having dissolved therein a compatible inert inorganic salt of a strong base and a weak acid in an oxygen free atmosphere, said salt being present in the dimethyl sulfoxide in a concentration of 0.01–0.05 mol per liter.

References Cited in the file of this patent
UNITED STATES PATENTS
2,602,779     Moyer _____ July 8, 1952